United States Patent
Gunz et al.

[11] Patent Number: 5,930,047
[45] Date of Patent: Jul. 27, 1999

[54] ANTI-GLARE DEVICE

[75] Inventors: Stefan Gunz; Donata Gunz-Castelberg; Manfred Castelberg, all of Wadenswil, Switzerland

[73] Assignee: Xelux Holding AG, Zug, Switzerland

[21] Appl. No.: 08/879,635

[22] Filed: Jun. 20, 1997

Related U.S. Application Data

[63] Continuation of application No. 08/426,258, Apr. 21, 1995, abandoned.

[51] Int. Cl.$^6$ .................... G02B 27/00; G02B 5/08
[52] U.S. Cl. ............ 359/601; 359/608; 359/610; 359/602; 359/603; 359/265; 359/272; 359/275
[58] Field of Search ................ 359/601, 608, 359/610, 613, 66, 68, 602, 603, 604, 507, 513, 265, 272, 275, 276, 277

[56] References Cited

U.S. PATENT DOCUMENTS

| | | | |
|---|---|---|---|
| 4,032,954 | 6/1977 | Grinberg et al. | 357/90 |
| 4,155,122 | 5/1979 | Budmiger | 2/8 |
| 4,198,647 | 4/1980 | Grinberg et al. | 359/84 |
| 4,468,103 | 8/1984 | Meckler | 351/158 |
| 4,679,254 | 7/1987 | Wiegel | 2/8 |
| 4,721,364 | 1/1988 | Itoh et al. | 359/602 |
| 4,726,660 | 2/1988 | Rushford | 359/72 |
| 4,756,605 | 7/1988 | Okada et al. | 359/83 |
| 4,842,376 | 6/1989 | Braatz et al. | 359/62 |
| 4,863,244 | 9/1989 | Fuerthbauer et al. | 359/58 |
| 4,917,466 | 4/1990 | Nakamura et al. | 359/88 |
| 5,091,018 | 2/1992 | Fraas et al. | 136/246 |
| 5,115,346 | 5/1992 | Lynam | 359/603 |
| 5,179,459 | 1/1993 | Plesinger | 359/74 |
| 5,187,510 | 2/1993 | Vogeley et al. | 353/122 |
| 5,206,749 | 4/1993 | Zavracky et al. | 359/59 |
| 5,210,628 | 5/1993 | Shields et al. | 359/72 |
| 5,245,420 | 9/1993 | Harney et al. | 358/86 |
| 5,247,375 | 9/1993 | Mochizuki et al. | 359/54 |
| 5,276,539 | 1/1994 | Humphrey | 351/44 |
| 5,283,676 | 2/1994 | Borah et al. | 359/67 |
| 5,377,032 | 12/1994 | Fergason et al. | 359/63 |
| 5,448,405 | 9/1995 | Clausen et al. | 359/609 |

FOREIGN PATENT DOCUMENTS

| | | | |
|---|---|---|---|
| 35 36 678 | 6/1984 | Germany . | |
| 45221 | 3/1985 | Japan | 359/602 |
| 73102 | 4/1986 | Japan | 359/602 |
| 97902 | 3/1988 | Japan | 359/603 |

*Primary Examiner*—Cassandra Spyrou
*Assistant Examiner*—Mohammad Y. Sikder
*Attorney, Agent, or Firm*—Gary M. Nath; Harold I. Novick; Nath & Associates

[57] ABSTRACT

An active anti-glare filter system in the form of a monoblock or solid unit which can be easily inserted into areas of protective helmets and goggles as a replacement or alternate filter includes an active and a passive optical filter elements, electronics which control the active optical filter element and a current supply, preferably in the form of a solar cell, which powers the electronics. Transparent cover plates surround the foregoing elements and are joined together and protected by a jointing mass.

18 Claims, 2 Drawing Sheets

ANTI-GLARE DEVICE

This application is a Continuation of U.S. patent application Ser. No. 08/426,258, filed Apr. 21, 1995, now abandoned.

BACKGROUND OF THE INVENTION

The present invention relates to an anti-glare device.

Anti-glare devices are well known to those skilled in the art for use in various fields and in various suitably adapted constructional forms. These anti-glare devices basically all comprise an arrangement for filtering light with at least one passive or active polarizer-analyzer-system and are equipped with further filter elements, in particular IR- and UV-blocking filters. Active systems with liquid crystal cells or other electro-optical components, particularly such as are used for welding masks, have refined electronic controlling means, sensor arrangements, adjustment means and voltage-supply circuits in order to satisfy the various needs and demands required by the specific usage of the light protection filter.

A welding mask with an electro-optical light filter system is described in DE-35,36,678. The viewing window is anchored in the protective mask by means of a specially formed frame and electric connection wires lead to the individual electronic parts, sensor elements and current supply parts which are individually attached to the interior of the protective mask. The deficiencies in such an arrangement become app rent during use, in particular during wet weather or under other difficult working conditions. Such arrangements are very prone to malfunction and are very difficult to protect against dust and humidity. Replacement of boiled or functionally damaged viewing windows is complicated, unpracticable and also costly.

SUMMARY OF THE INVENTION

It is therefore the aim of modern glare protection technology to provide anti-glare devices which are universally applicable, irrespective of their field of application. In particular it is the aim of the present invention to provide a universally applicable anti-glare device which does not have the deficiencies of the known arrangement and, above all, is well protected against those environmental influences which could impair its functioning, is easily replaceable and which can be inserted into protective classes, masks or helmets which are equipped with normal dark glass.

This problem is solved by an anti-glare device according to the present invention. This anti-glare device is constructed as a monoblock, i.e. it comprises not only the light protection system, but also the required electronic aid current supply. In order to easily employ this monoblock, the entire anti-glare device has the thickness and exterior shape of well known dark glasses, which are more suitable for some types of work. This monoblock type of construction, i.e. the specific use of special jointing or adhesive masses provides for the first time a dependable protection of the optical system against humidity, dust or other physical or chemical contamination, increases its durability and reduces the susceptability of the anti-glare device to damage in practical use.

In a preferred embodiment of the inventive anti-glare device different types of jointing masses are applied, and in particular are injected, poured or foam-sprayed.

Further embodiments of the inventive anti-glare device are derived from the features of the present dependent claims.

For example, the jointing masses can be mixed with additives which influence the transmission properties of the jointing masses in a desired manner, or in combination with coatings on the cover plates result in particular optical effects. Also, the solar cell can be part of the construction of the light protection filter arrangement, and thus the electrical connections can be generated by electrically conductive jointing masses.

In a further embodiment of the invention operating and adjustment elements are provided which, for example, can be incorporated as a foil key pad to the front or rear side of the anti-glare device. It is understood that batteries or plug connections for rechargeable current sources can also be provided on the sides, for instance.

The invention is more closely described with reference to the drawings.

DETAILED DESCRIPTION OF THE PREFERRED EMBODIMENTS

Figure 1:
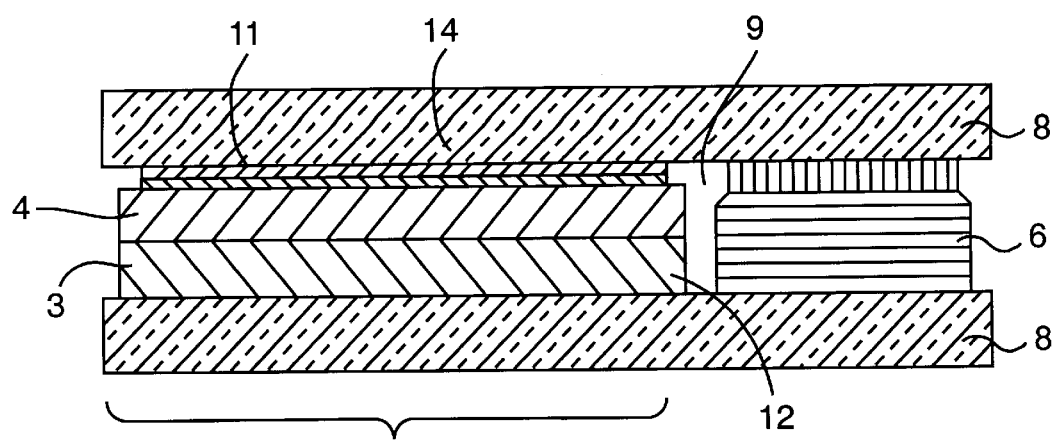
FIG. 1 shows a cross section through an inventive anti-glare device, which comprises a jointing mass serving as a passive optical filter element.

The anti-glare device as shown in FIG. 1 comprises a lower cover plate a made of glass or transparent polycarbonate. Adhesively attached to this is a first liquid crystal cell 3, which, with the aid of an electrically conductive adhesive mass 12 is conductively connected to an electronic component 6. A second liquid crystal cell 4, being directly on top of the first liquid crystal cell 3, is also conductively connected to the electronics 6 by means of an electrically conductive ahdesive mass 12. The spate between the different conductive adhesive massed 12 are preferably filled up with an isolating jointing mass 9. The particular composition of the applied jointing masses is not subject of the present invention and can be suitably chosen by the expert. Over the individual electronic components and the intermediate spaces 13 lies a solar cell 7, onto which a second upper cover plate 8 is applied. This upper cover plate 8 comprises a coating 11 functioning as an IR-blocking filter in the region of the optical glare protection filter arrangement 2. An intermediate space between this coating 11 and the second liquid crystal cell 4 is filled with a jointing mass comprising optically active additives. Due to this construction fixing elements, in particular spacing elements, are superfluous, and the thickness of the entire anti-glare device can be considerably reduced.

Figure 2:
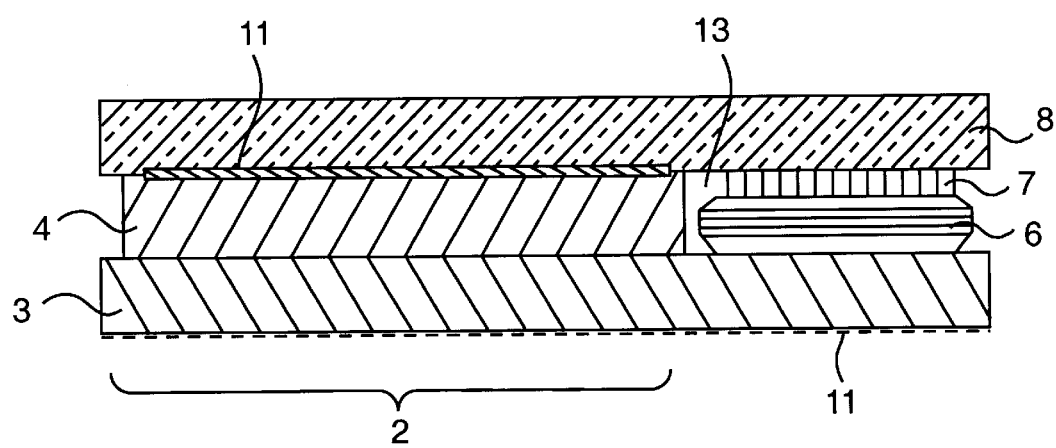
FIG. 2 shows a cross section through an inventive anti-glare device, which comprises a supporting part of a liquid crystal cell as cover plate.

However, in order to obtain an inventive monoblock with only a slight thickness in the range of 3 mm to 5 mm, the embodiment according to FIG. 2 comprises a stable liquid crystal display (LCD) 3 serving as a first cover plate 8, which LCD is coated on its exterior surface with an additional anti-reflective and breakage protective coating 11 which functions as a heat reflector or scratch protection. The electronics 6 are also arranged in such a manner that they fully use the available space in a lengthwise direction. A second liquid crystal display 4 is connected by means of an electrically conductive adhesive mass 12 to this electronic component 6, and lies directly under an optical barrier layer 11 of the upper cover plate 8 made of glass or scratch resistant plastic. A solar cell 7 between the electronics 6 and this upper cover plate 8 supplies the necessary current for the control and operation of the LCD's 3 and 4.

Figure 3:
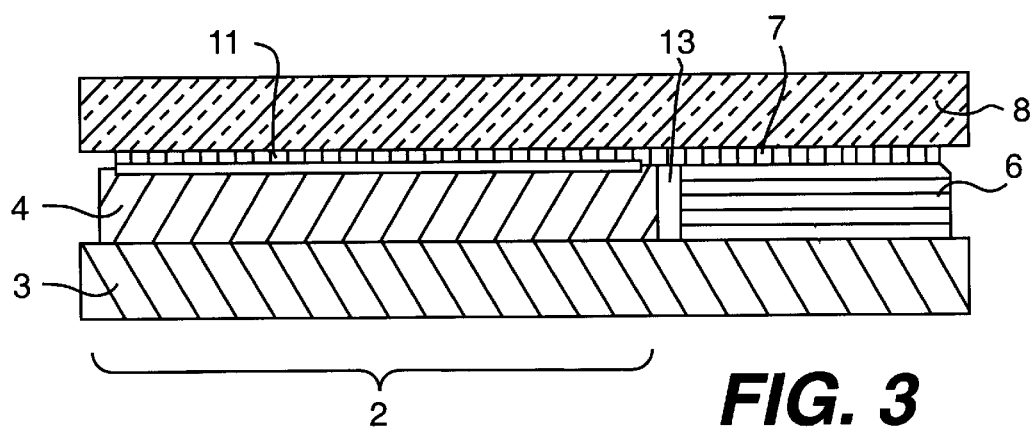
FIG. 3 shows a cross section through an inventive anti-glare device, which comprises a solar cell serving as a passive optical filter element.

FIG. 3 shows an anti-glare device whose construction differs from that of FIG. 2 only in that the solar cell 7 is transparent to a defined degree, and extends over the optical area 2 of the light protection filter 3, thereby supplying the electronics 6 with a more powerful current supply.

The reduction in thickness of the anti-glare device achieved by this monoblock construction is substantially due to the fact that the individual electro-optical elements no longer require separate supporting elements.

Figure 4:
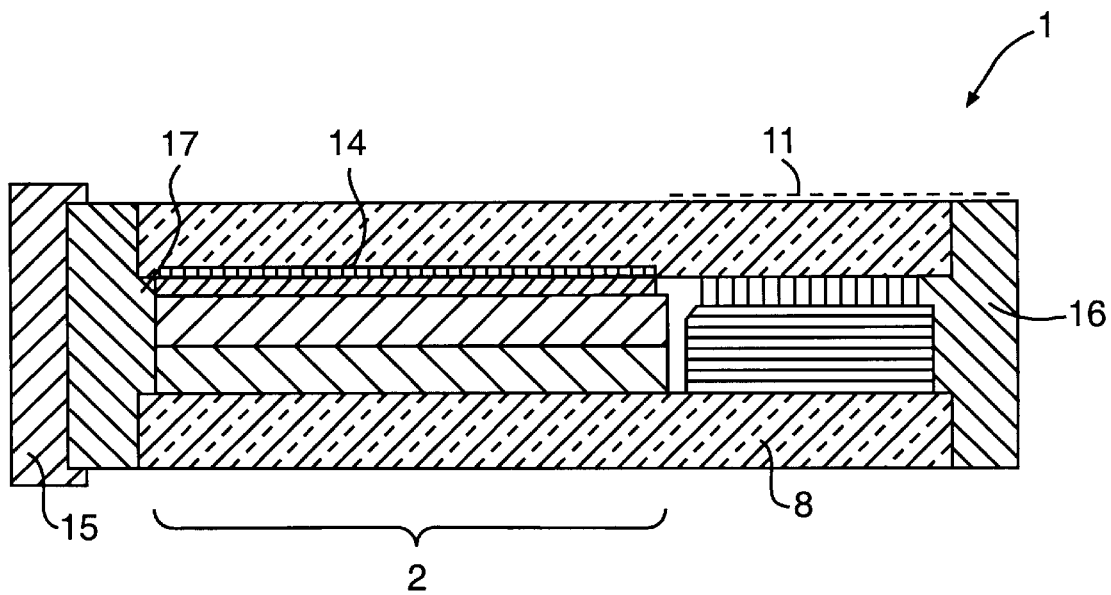
FIG. 4 shows a cross sec ion through an inventive anti-glare device, on which the edge is luted to a plastic frame.
Figure 5:
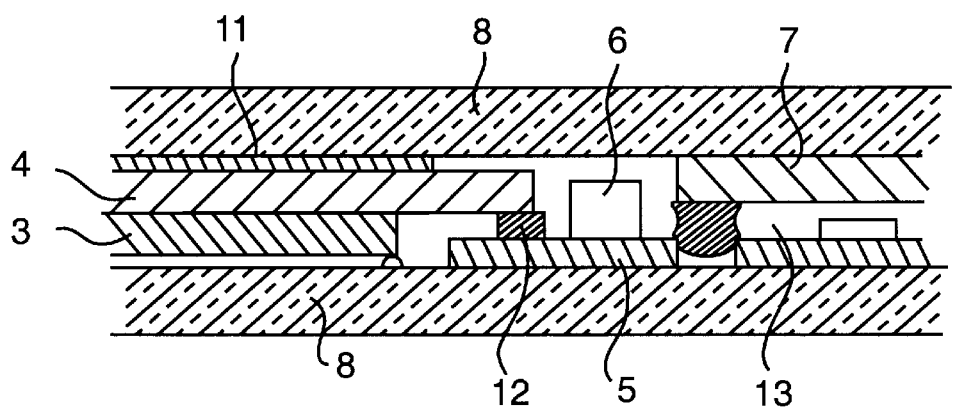
FIG. 5 shows a cross section through an inventive anti-glare device, whereby the electronics are in the form of a circuit board.

FIG. 4 shows the use of an assembly aid 16, by means of which the inventive monoblock can be easily assembled. This assembly aid 16 comprises positioning fingers 17 which retain the elements to be assembled in their correct positions during assembly. It is understood that in this monoblock type of construction cover plates 8 are used onto which the electronic circuitry is applied in the form of printed circuits 5 or directly as a microchip, or is sputtered on with the aid of chip-on-glass technology and/or is doped on, as can be seen in detail in FIG. 5. In particular, with this type of monoblock construction the electronics 6 can be combined with a foil key pad which can be applied both to the side and also on the surface plane of the cover plate 8. The inventive monoblock technology also provides the possibility of providing hollow spaces, for example for the inclusion of replaceable additional batteries.

Modifications and further developments of this anti-glare device are within the scope of those skilled in the art and do not require special incentive skills. In particular, colorations or combinations of known mechanical, optical and electro-optical elements can be freely chosen and combined. It is understood that this inventive anti-glare device can be used not only as a universal fit-in element in welding masks but is also suitable for inclusion in diving masks, pilot helmets or mining masks.

The present invention also enables the use of an injection molded frame 15 which protects the anti-glare device from mechanical damages and can be simply formed in such a manner as to be able to be fittingly inserted into existant supports. It is understood that this frame 15 and the cover plate 8 are made of the same material and can be formed out with the same injection-melding process.

It is also within the skill of the expert to provide the integrated electronics with sensors, by means of which a contact-free programming or adjustment of the electronics can be carried out through the hermetically sealed casing before or during operation.

We claims:

1. Anti-glare device for protective masks which utilize a glare protection filter comprising:

at least one active and one passive optical filter element;

electronics for controlling the at least one active optical filter elements;

a current supply means for the electronics;

at least one transparent cover plate; and a sealing means for sealing and protecting against adverse environmental conditions at least the optical filter elements, the electronics and the current supply to said cover plate, said sealing means comprising a jointing mass and means for provoking an optical effect; and wherein the entire anti-glare device is formed as a monoblock with constant thickness with a thickness in the range of 3 mm to 5 mm.

2. Anti-glare device according to claim 1, characterized in that said means for provoking an optical effect comprises additives which are contained in said jointing mass.

3. Anti-glare device according to claim 1, and further comprising an additional cover plate such that there is an upper and a lower cover plate; and wherein said filter elements, current supply means and said electronics are arranged between said cover plates and are adhesively attached to each other.

4. Anti-glare device according to claim 1, and further comprising a second cover elate; and;

characterized in that at least one of the cover plates comprises at least one coating on its interior surface.

5. Anti-glare device according to claim 4, characterized in that said coating is a coating operating as an optical filter.

6. Anti-glare device according to claim 1, characterized in that said cover plate includes a coating on the exterior side of the cover plate operating as a heat reflector and as an anti-reflective scratch protection.

7. Anti-glare device according to claim 1, characterized in that the electronics are applied directly to the cover plate.

8. Anti-glare device according to claim 1, characterized in that the current supply means, the electronics and the active optical filter elements are connected to each other by means of an electrically conductive adhesive material.

9. Anti-glare device according to claim 1, characterized in that the transparent cover plate comprises a glass plate.

10. Anti-glare device according to claim 9, characterized in that the cover plate forms part of said active optical filter element.

11. Anti-glare device according to claim 1, characterized in that said current supply means is a solar cell which is a transparent component of the anti-glare device. Cancel claim 12 without prejudice or disclaimer.

12. Anti-glare device according to one of claim 1, characterized in that the anti-glare device (1) comprises an assembly aid (16).

13. Anti-glare device according to one of claim 1, characterized in that the anti-glare device (1) is embedded in an injection-molded frame (15).

14. Anti-glare device according to claim 13, characterized in that the cover plates (8) and the frame (15) form a mutual and in particular a single casing.

15. Anti-glare device according to claim 1, characterized in that the electronics comprise sensor elements, by means of which a contact-free programming or adjustment can be carried out prior to or during operation through the cover plate.

16. Anti-glare device according to claim 1, characterized in that said means for provoking an optical effect comprises a coating on the interior surface of said cover plate.

17. An anti-glare device for use with devices requiring a glare protection filter, said anti-glare device comprising:

a monoblock formed in a shape suitable for use in equipment requiring glare protection such that the entire anti-glare device is within said monoblock, said monoblock having a constant thickness with a thickness in the range of 3 mm to 5 mm and including an active optical filter element;

a passive optical filter element;

electronic means for controlling said active optical filter element, said electronic means being coupled to said active optical filter element;

a current supply means coupled to said active optical filter and said electronic means for supplying electrical power to said active optical filter and said electronic means;

a pair of transparent cover plates between which are located said active optical filter element, said passive filter element, said electronic means and said current supply means; and adhesive joining means for forming said monoblock and for adhesively retaining and forming a protective barrier about at least said active optical filter element, said electronic means and said current supply means.

18. Anti-glare device for protective masks wherein the entire anti-glare device is formed as a monoblock laminate that is a glare protection filter having an optical glare protection area and a component area located adjacent to but outside of said glare protection area, said monoblock laminate having a constant thickness with a thickness in the range of 3 mm to 5 mm and being comprised of:

a top transparent cover;

a bottom transparent cover, said covers covering both said areas;

a passive optical filter element located in said glare protection area;

an active optical filter element located in said glare protection area;

electronics which control said active optical filter element and are mounted on said bottom cover located between said covers in said component area;

a current supply means for providing electric current to said electronics and located between said covers; and a transparent jointing mass which retains and forms a protective barrier about at least said active optical filter element, said passive optical filter element, said electronics and said current supply means.

* * * * *

UNITED STATES PATENT AND TRADEMARK OFFICE
CERTIFICATE OF CORRECTION

PATENT NO. : 5,930,047
DATED : July 27, 1999
INVENTOR(S) : Stefan Gunz et al.

It is certified that error appears in the above-identified patent and that said Letters Patent is hereby corrected as shown below:

Claim 4, Line 2, delete "elate" and insert
--plate--

Claim 11, Line 3 and 4, delete "Cancel claim 12 without prejudice or disclaimer"

Signed and Sealed this

Seventh Day of December, 1999

Attest:

Q. TODD DICKINSON

*Attesting Officer*        *Acting Commissioner of Patents and Trademarks*